Nov. 24, 1953 — J. HESS — 2,659,929
SPRING ASSEMBLY
Filed June 3, 1948 — 4 Sheets-Sheet 1
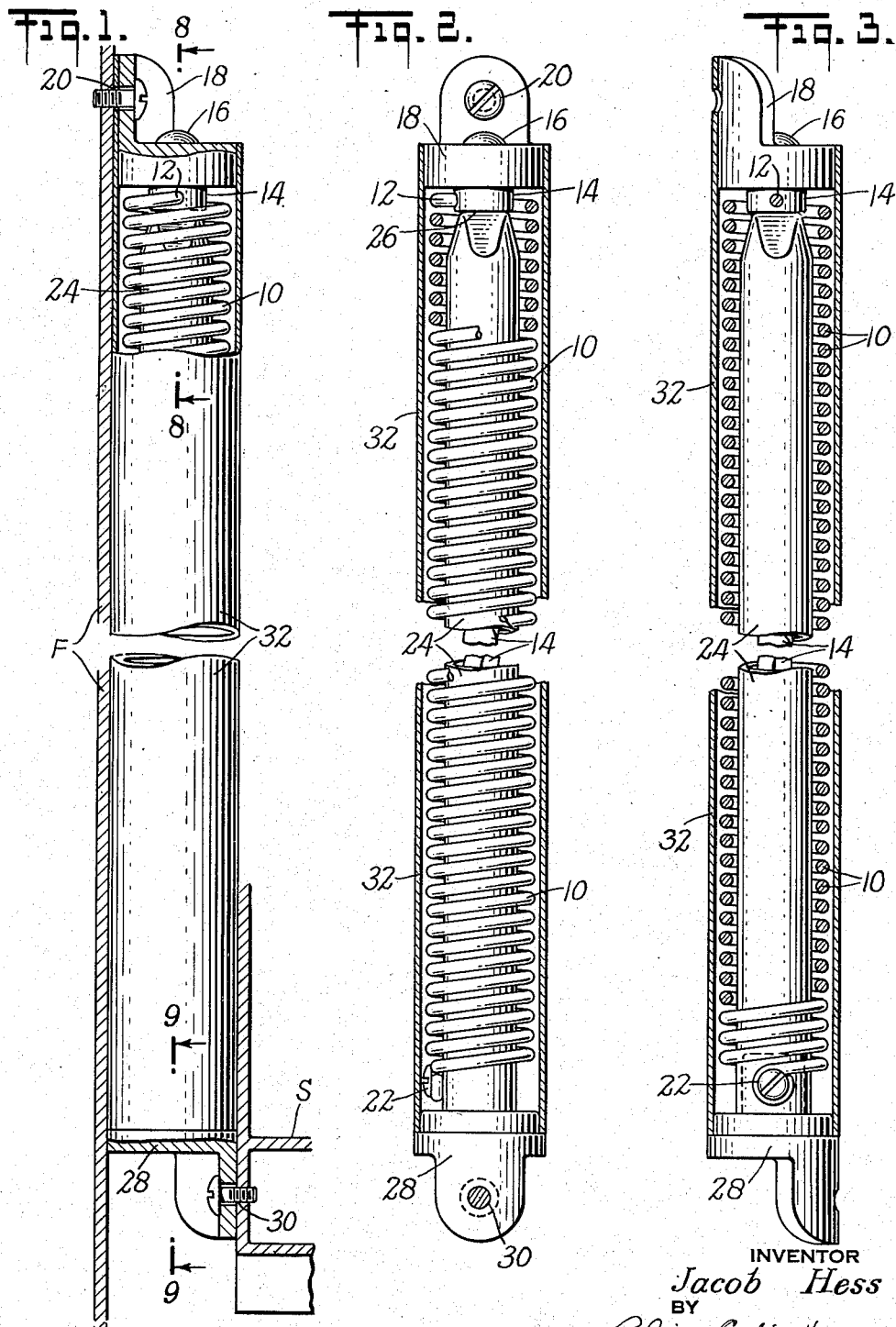
INVENTOR
Jacob Hess
BY
Blair, Curtis & Hayward
ATTORNEYS Nov. 24, 1953  J. HESS  2,659,929
SPRING ASSEMBLY
Filed June 3, 1948  4 Sheets-Sheet 2
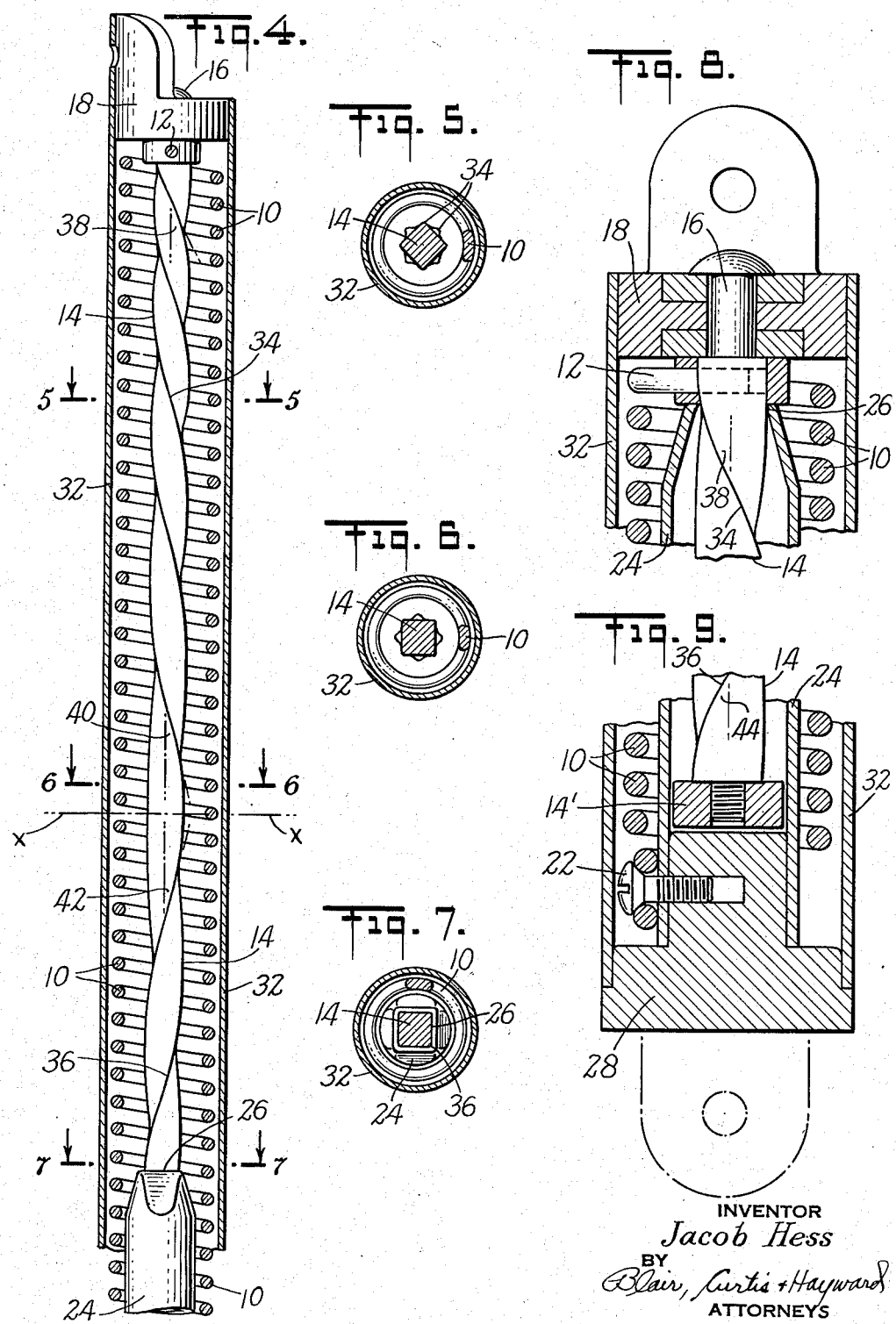
INVENTOR
Jacob Hess
BY
Blair, Curtis + Hayward
ATTORNEYS Nov. 24, 1953 J. HESS 2,659,929
SPRING ASSEMBLY
Filed June 3, 1948 4 Sheets-Sheet 4

INVENTOR
Jacob Hess
BY
Blair, Curtis & Hayward
ATTORNEYS

Patented Nov. 24, 1953

2,659,929

UNITED STATES PATENT OFFICE 2,659,929

SPRING ASSEMBLY

Jacob Hess, Forest Hills, N. Y., assignor to General Bronze Corporation, Garden City, N. Y.

Application June 3, 1948, Serial No. 30,810

3 Claims. (Cl. 16—197)

This invention relates to a spring assembly.

An object of the invention resides in the provision of a spring assembly that is so constructed that it will support or balance the weight of a given object in various positions of adjustment.

It is an object of the invention to provide such a spring assembly, which for convenience of expression I shall hereafter term a spring balance, which employs forces built up in a coil spring by its lineal extension and its axial winding to support a weight in given and various positions of adjustment.

A further object of the invention resides in so constructing such a spring balance that the tension created by the lineal extension of the spring and the torsion created by the helical winding of the spring will so supplement each other, and will be so controlled that when the spring assembly is attached to two relatively movable objects which are capable of moving relatively toward each other the objects may be moved relatively in respect of each other and will be maintained in their relative positions of adjustment.

A further object of the invention is to provide a spring assembly which includes means for attaching the assembly to two spaced relatively movable objects which tend to resist movement toward each other with a given force and which includes a combined tension and torsion spring connected with said relatively movable objects through said attaching means, together with means to vary the torsional effect of said spring as the tension of said spring increases in amount equal to the difference between the tensional force in various stages of elongations of said spring and the given force.

A still further object of the invention is to provide a spring assembly which includes means for attaching the assembly to two spaced relatively movable objects which tend to resist movement toward each other with a given force and which includes a combined tension and torsion spring connected with said relatively movable objects through said attaching means, together with means to vary the torsional effect of said spring as the tension of said spring increases in amount equal to the difference between the tensional force in various stages of elongations of said spring and the given force developed in said spring in excess of the given force in which assembly the attaching means includes means for translating the torsional force developed during the elongation of the spring into a force which reacts against said given force in a lineal direction and substantially in alignment with the direction of the exertion of the force that is exerted by the tension of said spring.

Other objects of the invention will appear as the description of the illustrated embodiment progresses.

Inasmuch as the spring balance is admirably adapted for use as a balancer for vertically slidable window sashes, I will describe the embodiment of the invention, which I have chosen for illustrative purposes in accordance with the requirements of the statute, as employed as a window balancer, but it is of course to be understood that in so describing I am not in any way limiting my invention to this use because the invention lies, not in the specific use of any embodiment thereof, but in devices which employ the broad principle which will later be described and which has above been referred to in the statement of objects.

In the drawing:

Figure 1 is an elevational view of an embodiment of my invention, parts thereof being broken away and the spring shown unextended;

Figure 2 is a longitudinal sectional view showing the parts in the positions illustrated in Figure 1, that is with the spring unextended;

Figure 3 is a longitudinal sectional view taken at right angles to Figure 2.

Figure 4 is a longitudinal sectional view of a portion of the embodiment of the invention showing the spring extended;

Figure 5 is a transverse sectional view on line 5—5 of Figure 4;

Figure 6 is a transverse sectional view on line 6—6 of Figure 4;

Figure 7 is a transverse sectional view on line 7—7 of Figure 4;

Figure 8 is an enlarged fragmentary sectional view showing the upper mounting of the rod;

Figure 9 is a similar sectional view showing the lower mounting of the rod;

Figure 10:
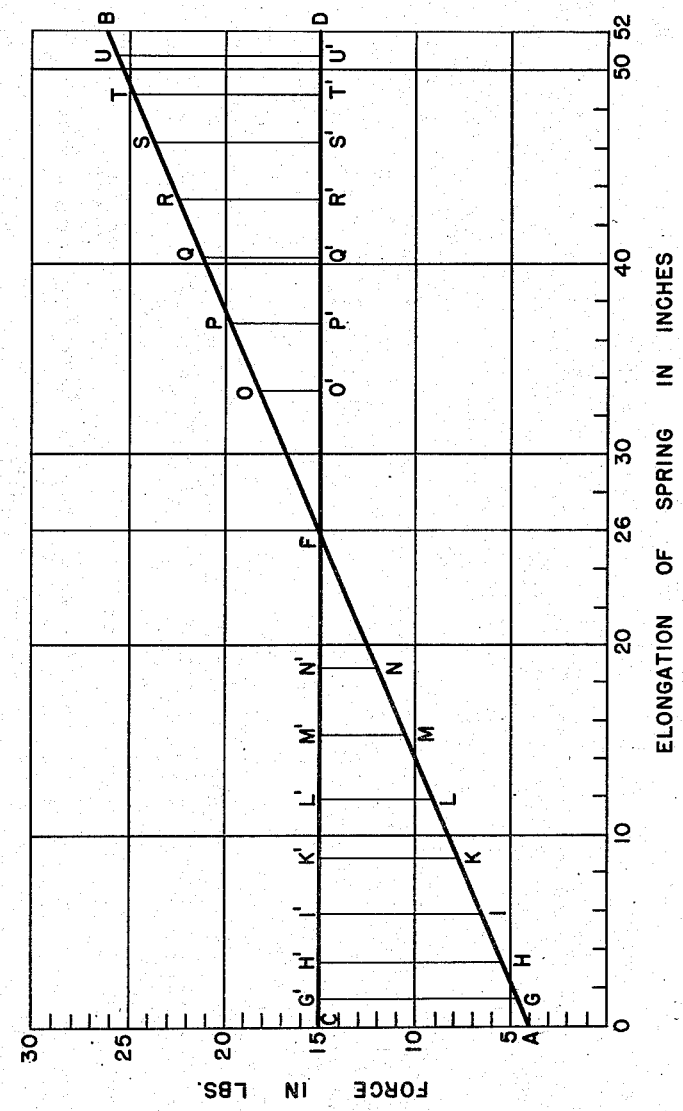
Figure 10 is a graph showing the relation of the tensional and torsional forces developed in the device.

Referring to the drawing, a window frame is indicated by the reference character F and a vertically slidable sash by the reference character S.

A helical spring 10, which is of substantially uniform characteristics in all respects throughout its length, and which is pre-tensioned and pre-torsioned in a manner which later will be explained, is secured at one of its ends, as at 12, to a rod 14, which rod is axially arranged within said spring and is mounted, at 16, for rotation in a bracket 18. This rod 14 is provided with an abutment 14' on its end to maintain it in assembled position later described. This bracket is for attachment, at 20, to one of two relatively movable objects such, for instance, as the window frame when the device is used as a window balancer.

The opposite end of the spring 10 is attached as at 22, to what I shall term a guide 24 which, in the form illustrated, is a tube having a guideway 26 at its upper end for the reception of the rod 14, which rod and guide are adapted to move relatively in respect of each other in axial and rotative directions.

The securing member 22 attaches the guide tube 24, as well as the spring 10, to a bracket 28, which is adapted to be secured, at 30, to the other of the two relatively movable objects which, when the device is used as a window balancer, is the sash that is to be balanced.

Optionally, a casing 32 may be provided for housing the spring 10, and when so provided, extends between and is secured to the bracket 18.

The rod 14, when in the form illustrated in the drawing, is produced by twisting a rod that is rectangular in cross section from an intermediate point such as defined by the line X—X in Figure 4 toward one of its ends, to produce edges or fins 34 which will, of course, be four in number because of the original rectangular form of the rod. The rod is twisted in the opposite direction from the point indicated at the line X—X of Figure 4 toward its opposite end to produce edges or fins 36 which are, too, four in number.

The guideway 26 in the guide tube 24 is of a configuration complemental to the cross section of the rod 14 so that, when the two ends of the balancer are moved relatively toward or away from each other, the rod 14 and the tube 24 will have relative rotative movement. The guide 24 preferably, being prevented from having rotative movement during the telescoping of the rod and the guide, the rod will have rotative movement as it moves into and out of said guide 24 and on the bearing at 16.

It is, of course, to be understood that the particular cross sectional configuration of the rod is not critical as it must necessarily only be of such configuration that its rotation will be produced by its relative movement longitudinally in respect of the guide 24 in the manner and to the extent hereinafter described.

Each edge or fin 34 passes helically around the longitudinal axis of the rod 14 from adjacent one of its ends to a point aligned with the line X—X in Figure 4, and in practice this edge or fin completes the 360° several times between the point X—X and the end of the rod. However, in passing each succeeding 360°, the longitudinal extent of the edge or fin increases. This means, of course, that the angle between the longitudinal axis of the rod and the edge will decrease as the lineal extent of the edge or fin increases in passing around the axis of the rod 360°. In other words, the angle, as at 38, for instance, will be of a greater number of degrees than the angle at 40, and the intermediate angles between 38 and 40 will be less than the angle at 38 and will gradually decrease to the angle at 40. The edges or fins 36 pass helically around the longitudinal axis of the rod 14 in a direction opposite to that in which the edges or fins 34 pass about this longitudinal axis and the angles which correspond with those indicated at and between 38 and 40 and which are indicated by the reference numerals 42 and 44 increase in their number of degrees from the angle 42 to the angle 44, the angular variations in the portions of the rod to each side of the line X—X being substantially the same.

At the point X—X each edge or fin 34 and each edge or fin 36 merge and at this point each edge is parallel with the longitudinal axis of the rod, thus forming what might be termed a neutral point.

Thus when the rod 14 and the guide 24 are telescoped, as shown in Figure 1, the guide way 26 will be engaged with the edges or fins 34 and, as the rod and guide are relatively extended by the movement apart of the brackets 18 and 28, for instance, the rod will be rotated in one direction. As this extension continues, when the guide way 26 reaches the neutral point at X—X, for that instant the rod will be given no rotative movement in either direction, but as the extension of the rod from the guide continues, the engagement of the edges or fins 36 with the guide way 26 will cause the rod to rotate in the opposite direction.

During the initial movement between the rod and guide from the position shown in Figure 1, the rotation of the rod will be rapid because of what I shall term the acute pitch or lead of the edges or fins 34, but as the extension continues and the pitch or lead becomes more gentle, that is to say, each edge or fin traverses more lineal extent of the rod, the rotation of the rod will become less rapid, or, in other words, the rod and the guide will have greater relatively longitudinal movement to accomplish a complete rotation of the rod through 360°.

As the extension continues there will be no rotative movement given to the rod at the point X—X, but thereafter the rotation of the rod will increase because of the fact that the pitch or lead of the edges or fins 36 becomes more and more acute from the point X—X toward the lower end of the rod.

In constructing this device, a spring of substantially uniform characteristics throughout its length, and which has an initial tension, is provided. After one end of the spring at 12, for instance, is attached to the rod, the spring is wound up to a desired degree to give it an initial torsion. Thus the spring will have both a pre-tension and a pre-torsion, and it will, as a result, have a tendency to contract longitudinally and to unwind axially. Of course after the spring has been given the proper torsion it is secured, at 22, as heretofore described.

Thus, assuming the parts of the device to be in the positions illustrated in Figure 1 of the drawing, with the spring under a pre-tension and pre-torsion, as the two brackets 18 and 28 are moved apart two things will transpire simultaneously. The tension of the spring will be increased and this increase will continue so long as the brackets are moved apart, or, in other words, so long as the spring is stretched longitudinally. Thus, as the tension increases the spring, through the tensional force developed, will have a greater and greater tendency to move the brackets toward each other. As the spring is extended the spring will be unwound axially because of the rotation of the rod 14 caused by the coaction between the rod and the guide 24, and as the unwinding of the spring continues the tortional reactive forces will of course increase. Since the pitch of the spiral increases continuously from its point of support to its mid point, the rate of increase of the torsional reactive force will diminish gradually as the guide way 26 approaches the neutral point X—X of the rod.

Thus the axial torsional force of the spring will tend to resist the elongation of the spring to a greater extent when the guide way 26 is engaged with the edges or fins 34 at the upper end of the rod, as in Figure 3, for instance, than when the guide way 26 and the edges or fins 34 interengage in the progress of their movement toward the neutral point X—X, at which latter point there will be no tendency, because of the fact that there is no angularity between this point and the axis of the rod, for the torsional force to rotate the rod and the result will be that the torsional force will have no tendency to oppose the extension of the spring or to move the brackets 18 and 28 toward each other. If the spring is stretched or extended further longitudinally the torsional force has a tendency to rotate the rod in the opposite direction and to counteract the tension of the spring.

The pitch or lead of the edges or fins 34 and 36 is such that at all times during the movement of the brackets 18 and 28 relative to each other the spring will exert a substantially uniform force tending to move the brackets 18 and 28 toward each other, regardless of the distance of the brackets apart.

To illustrate, and supposing the bracket is to be fixedly attached to a stationary portion of a window frame F, and the bracket 28 to be fixedly attached to a slidable window sash of 15 pounds in weight, and assuming the parts to be in the positions as shown in Figure 1, the initial or pre-tension of the spring may, for example, be assumed to be 4 pounds, and it will exert a 4 pound lifting or supporting influence on the sash. In the event of the existence of such a 4 pound influence, the spring will have or will have been given a pre-torsion which will react through the rod at its upper end to support 11 pounds, with the result that before the window can be lowered a force greater than the 15 pounds reactive force created by the spring must be applied to the sash. The sash being of a 15 pound weight will remain stationary and will thus be supported. When the sash is moved downwardly, however, with a resultant stretching of the spring and unwinding of the spring in the manner heretofore described, and until the guideway 26 reaches the neutral point X—X, the tension of the spring will be gradually increased toward the 15 pound limit and the axial torsional force exerted will gradually decrease in proportion to the increase of the tensional force. The result will be that when the guideway 26 and the point X—X align, and because of the relationship between the torsional functioning of the spring, the guide 24 and the edges or fins 34, the entire 15 pound weight of the sash will be supported by the tensional force developed in the spring and the torsional force developed will have no tendency to support the sash.

However, should the downward movement of the sash be continued, the tensional force developed will increase beyond the 15 pounds, which corresponds with the weight of the sash, and to the extent that the tensional force increases beyond said 15 pound limit, the torsional force in cooperation with the oppositely twisted rod will resist the contraction of the spring or the rising of the sash with a force equal to that by which the tensional force exceeds the 15 pound limits.

Thus the spring balance here described is of such construction that when used, by way of example, as a window balancer, the sash will be supported in all positions of its vertical adjustment by a force substantially equal to the weight of the sash.

Entirely by way of example and not by way of limitation in any sense, I hereupon give an example of an embodiment of my invention which I have successfully used to carry out the functions and obtain the results, in this application disclosed.

The embodiment which I now describe by way of example, is substantially structurally the same as that disclosed in the drawings wherein was used a helical steel spring with an outside diameter of .720 inch, the diameter of the wire of said spring being .080 inch. The overall length of the spring, unstretched, was fifty-two inches and the initial tension of the spring, unstretched, was 4 pounds. The tension of the spring when stretched to one hundred and eight inches was 26 pounds. Referring to the drawings herein, for convenience, the distance between the points 12 and the line X—X was 26 inches and the distance between the line X—X and the point 22 was 26 inches. The rod 14 had seven and one-half complete turns, i. e., each edge of the rod completed 2700° around the axis of the rod 14 from the line X—X toward each end of said rod.

The graph of this spring arrangement showing the relation of the tensional and torsional forces is illustrated in Figure 10 of the drawing. On this graph the coordinates represent, as indicated in Figure 10, force in pounds and elongation of the spring in inches.

The line AFB indicates the approximate tensional forces of the spring, in pounds, when stretched to various lengths up to 52 inches, the spring being under an initial tension of 4 pounds when unstretched as indicated at point A, and having 26 pounds of tensional force when stretched to 52 inches as indicated at B.

The vertical distances between the lines AF and CF indicate the torsional force tending to resist elongation of the spring as the guideway 26 moves from its upper position of Figure 1 toward the point X—X, which torsional force acts to augment the tensional force of the spring.

The vertical distances between the lines FB and FD indicate the torsional force tending to elongate the spring as the guideway 26 moves from the point X—X toward the end of its movement in relation to the rod 14, the torsional force at this time acting in depreciation of the tensional force of the spring and in an opposite direction.

The line CFD indicates the net resultant force acting on the sash when the friction existing in the balance is not taken into consideration. The friction will resist movement in either direction and therefore when the sash S is assumed to be 15 pounds it will be balanced in any position of its vertical movements.

It is pointed out that the point F, which is shown as midway between the points A and B, is so located because the particular spring arrangement of which this graph was prepared was so constructed, but it is to be understood that this point F may be shifted toward and to the points B and A which will produce a corresponding change in the form of the rod 14.

When the number of twists of the rod 14, i. e., the number of times an edge passes helically around the axis of the rod 14 above the line X—X is selected, the area ACF is divided into a number of equal areas and the distances between the points C—G′ and G′—H′ and H′—I′, and I′—K′, etc. correspond with the lengths of the edges of the rod as they pass 360° around the axis of the rod.

Likewise the corresponding lengths of the edges of the rod 14 below the line X—X are similarly determined. It is to be noted in the graph illustrated in the drawings that the areas NN′F and the area FOO′ are each one half of the other described areas, and this is because the particular graph illustrates seven and one half turns of the rod.

The formula for determining the distances between the points G′ and F, H′ and F, I′ and F, etc. is $$G'F = \frac{L}{\left(\frac{N}{N-1}\right)^{\frac{1}{2}}}, \quad H'F = \frac{L}{\left(\frac{N}{N-2}\right)^{\frac{1}{2}}}, \quad I'F = \frac{L}{\left(\frac{N}{N-3}\right)^{\frac{1}{2}}}$$

$$K'F = \frac{L}{\left(\frac{N}{N-4}\right)^{\frac{1}{2}}}, \quad L'F = \frac{L}{\left(\frac{N}{N-5}\right)^{\frac{1}{2}}}, \text{ etc.}$$

In the above formula L is the length of the line between the point C and the point F and N is the number of twists in rod 14 or in this illustration $L = 26$, $N = 7\frac{1}{2}$.

While the above formula is substantially correct, it nevertheless leaves out of consideration the increase of torsional force of the spring and the variation of frictional forces as the spring is extended. However, this formula is varied when the increasing torsional force and the variable frictional losses are taken into consideration to the extent that instead of the denominator being to the one half power it is to a power less than the one half power but greater than the one third power.

Figure 11:
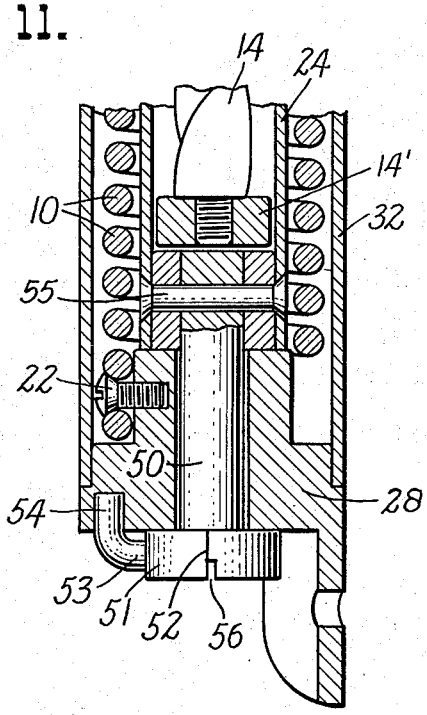
Figure 11 is a sectional view showing means for adjusting the torsion of the spring after or during the installation of the device.
Figure 12:
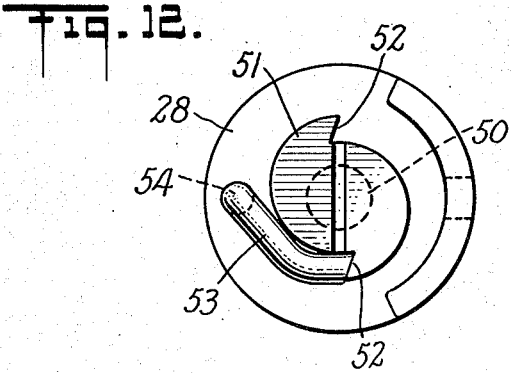
Figure 12 is a bottom plan view thereof.

Referring to Figures 11 and 12, the guide tube 24 is secured to a pin 50 which is rotatably mounted in the bracket 28 and carries a head 51 on its end in which are notches 52. A pawl 53 is mounted at 53 in the bracket 28 and is adapted to engage and be disengaged from the notches 52 to maintain the pin against rotation or to permit it to rotate as the case may be.

This pin is secured by suitable means such as a rivet 55 to the tube 24 and is preferably provided with a screw driver slot 56 by means of which it may be rotated. The tube 24 and the upper end of the spring being secured together, the spring may be additionally torsioned by rotation of the pin 50 and held in such adjusted position by the engagement of the pawl 53 with one or the other of the notches 52.

Thus it will be possible to adjust the torsion of the spring to adapt it to particular installations where the weight of the object, such as the window sash, necessitates such an adjustment.

While I have illustrated and described a particular embodiment and a particular example of the application of my invention, it is to be understood that many variations in structural features and embodiments may be made without departing from the spirit of the invention and without exceeding the scope of the claims and I therefore do not wish to be limited to that particular embodiment or example except insofar as limitation is made necessary by the claims themselves.

I claim:
1. A spring assembly adapted to be used to balance the weight of a window sash vertically movable in a window frame comprising in combination, a pair of spaced brackets adapted to be connected to said frame and sash respectively, a spiral actuator rotatably supported on one of said brackets and a cooperating key-way through which said actuator extends, said key-way being formed in one end of a tube, the other end of which is secured to the other of said brackets, a coil spring surrounding said actuator and tube, one end of said spring being connected to said actuator near its point of support and the other end of said spring being effectively connected to said other bracket, said actuator comprising two oppositely wound spiral sections extending in opposite directions from a point near the center thereof, the spiral section adjacent to the point of support of said actuator being wound in opposite sense with respect to the spiral of said coil spring, and the spiral section remote from the point of support of said actuator being wound in the same sense as the spiral of said spring, and manually adjustable means operatively associated with said other bracket for varying the torsion of said spring.

2. A spring assembly adapted to be used to balance the weight of a window sash vertically movable in a window frame comprising in combination, a pair of spaced bracket members adapted to be connected to said frame and sash respectively, a coil spring effectively connected at its ends to said brackets, a pair of spring operating members, one of which is a spiral actuator effectively connected to one of said brackets and the other of which is a cooperating key-way through which said actuator extends, said key-way being effectively connected to the other of said brackets, one of said operating members being rotatably secured to its associated bracket and one end of said spring being secured to said rotatable member near said associated bracket, said actuator comprising two oppositely wound spiral sections extending in opposite directions from a point near the center thereof, the spiral section of said actuator nearer said one bracket being wound in opposite sense with respect to the spiral of said spring and the spiral section more remote from said one bracket being wound in the same sense as the spiral of said spring.

3. A spring assembly adapted to be used to balance the weight of a window sash vertically movable in a window frame comprising in combination, a pair of spaced bracket members adapted to be connected to said frame and sash respectively, a coil spring effectively connected at its ends to said brackets, a pair of spring operating members, one of which is a spiral actuator mounted for rotation on one of said brackets and the other of which is a cooperating key-way through which said actuator extends, said key-way being effectively secured to the other of said brackets, one end of said spring being secured to said spiral actuator near said one bracket, the spiral of said actuator adjacent to its point of connection to said one bracket and the spiral of said coil spring being wound in opposite sense.

JACOB HESS.

References Cited in the file of this patent

UNITED STATES PATENTS

| Number | Name | Date |
|---|---|---|
| 2,041,646 | Larson | May 19, 1936 |
| 2,577,953 | DeVries et al. | Dec. 11, 1951 |